US009588573B2

(12) United States Patent
Lee

(10) Patent No.: US 9,588,573 B2
(45) Date of Patent: Mar. 7, 2017

(54) REDUCED-POWER TRACE ARRAY FOR A PROCESSOR

(71) Applicant: GLOBALFOUNDRIES Inc., Grand Cayman (KY)

(72) Inventor: Michael J. Lee, Austin, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 460 days.

(21) Appl. No.: 14/064,313

(22) Filed: Oct. 28, 2013

(65) Prior Publication Data

US 2015/0121097 A1    Apr. 30, 2015

(51) Int. Cl.
*G06F 1/32* (2006.01)

(52) U.S. Cl.
CPC ........ *G06F 1/3243* (2013.01); *Y02B 60/1239* (2013.01)

(58) Field of Classification Search
CPC .......................... G06F 1/3243; Y02B 60/1239
See application file for complete search history.

(56) References Cited

U.S. PATENT DOCUMENTS

| 5,982,675 | A * | 11/1999 | Fujimoto | G06F 12/0802 365/189.05 |
| 6,857,083 | B2 * | 2/2005 | Floyd | G06F 11/261 712/227 |
| 7,457,917 | B2 * | 11/2008 | Damaraju | G06F 9/3802 711/118 |
| 9,053,138 | B2 * | 6/2015 | Carney | H03M 7/30 |
| 2002/0078264 | A1 * | 6/2002 | Eberhard | G06F 11/349 710/1 |
| 2002/0129309 | A1 * | 9/2002 | Floyd | G06F 11/261 714/724 |
| 2003/0088738 | A1 * | 5/2003 | Fox | G06F 11/348 711/129 |
| 2006/0036834 | A1 * | 2/2006 | Maiyuran | G06F 9/3808 712/214 |

(Continued)

OTHER PUBLICATIONS

Sharma, et al., "SRAM Design for Wireless Sensor Networks: Energy Efficiency and Variability Resilient Techniques", 2013, pp. 102-116, Springer Science+Business Media, New York.

*Primary Examiner* — M Elamin
(74) *Attorney, Agent, or Firm* — Anthony Canale; Andrew M. Calderon; Roberts Mlotkowski Safran Cole & Calderon, P.C.

(57) ABSTRACT

A trace array having features that provide reduced power consumption/power dissipation in processor circuits. The trace array circuit stores processor states during program execution and provides a resulting trace for subsequent analysis. The trace array includes power management features that, responsive to a control signal, reduce the power consumption of the trace array. A first state of the control signal indicates that the trace array circuit is storing states during the execution of the program and a second state of the control signal is set to enable the trace array for reading the collected states. The trace array may have dynamic read bit-lines and static write bit-lines to further reduce power consumption, and the pre-charge circuits that charge the dynamic read bit-lines may be selectively disabled in response to the first state of the control signal. Write-through may also be selectively disabled and optionally bypassed during state collection.

20 Claims, 5 Drawing Sheets

(56) References Cited

U.S. PATENT DOCUMENTS

| | | | |
|---|---|---|---|
| 2006/0143382 A1* | 6/2006 | Damaraju | G06F 9/3802 |
| | | | 711/118 |
| 2007/0113057 A1* | 5/2007 | Knoth | G06F 1/3203 |
| | | | 712/241 |
| 2008/0016408 A1* | 1/2008 | Abernathy | G06F 11/3636 |
| | | | 714/45 |
| 2008/0086595 A1* | 4/2008 | Davis | G06F 9/3808 |
| | | | 711/122 |
| 2011/0317505 A1 | 12/2011 | Bunce et al. | |
| 2013/0083613 A1 | 4/2013 | Phan et al. | |

* cited by examiner

REDUCED-POWER TRACE ARRAY FOR A PROCESSOR

BACKGROUND OF THE INVENTION

1. Field of the Invention

The present invention is related to processor integrated circuits, and more specifically to a trace array circuit having features that reduce power consumption of the processor.

2. Description of Related Art

Power consumption in processors and other very-large-scale integrated (VLSI) circuits is managed in design and dynamically in order to reduce energy use in the systems in which the circuits are installed, and also in managing generated heat due to power dissipation. While the functional units in processors are typically optimized to reduce power consumption, other units within processors that are frequently active during operation can benefit from designs that reduce power consumption, and techniques that intelligently manage those other units to manage power consumption.

One type of other unit that is typically present in a processor is a trace array. Trace arrays are used to gather processor state information during execution of a program for subsequent analysis of the program, the processor logic, or other conditions of the operating environment that cause changes in the state of the processor. Trace arrays in modern processors are ubiquitous, with large numbers of trace arrays gathering the state information at different locations within an integrated circuit die that will typically contain several processors. Since the trace arrays are gathering data constantly, the trace array power consumption/power dissipation can be a substantial component in the total power consumption/power dissipation, especially when the design of the functional units is power-optimized.

It would therefore be desirable to provide a processor and trace array circuit having reduced power consumption.

BRIEF SUMMARY OF THE INVENTION

The invention is embodied in a trace array circuit, a processor and method that provide reduced power consumption/power dissipation of the trace array circuit. The method is a method of operation of the trace array circuit and the processor is a processor that includes one or more of the trace array circuits.

The trace array circuit stores states of one or more functional units during execution of a program and provides a resulting trace for subsequent analysis. The trace array includes power management features that, responsive to a control signal, reduce the power consumption of the trace array. A first state of the control signal indicates that the trace array circuit is storing states during the execution of the program and a second state of the control signal is set to enable the trace array for reading the collected states. The trace array may be designed with dynamic read bit-lines and static write bit-lines to further reduce power consumption, and the pre-charge circuits that charge the dynamic read bit-lines may be selectively disabled in response to the first state of the control signal. Write-through in the trace array may be disabled selectively in response to the first state of the control signal, and a write bypass logic may be provided to simulate write-through operation behavior.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to processors and other circuits in which trace arrays are included to capture real-time state information. Various design features reduce the power consumption of the trace arrays as described in further detail below. The trace array responds selectively to whether the trace array is capturing data, or is in another state such as during read-back of trace results or during built-in-self-test (BIST). The power consumption-reducing features may include one or more of: selectively disabling write-through operations during capture of data and optionally providing a write-through bypass, selectively disabling read bit-line pre-charge during capture of data and providing static write bit-lines to reduce write pre-charge power consumption during continuous sequential writes of trace information.

Figure 1:
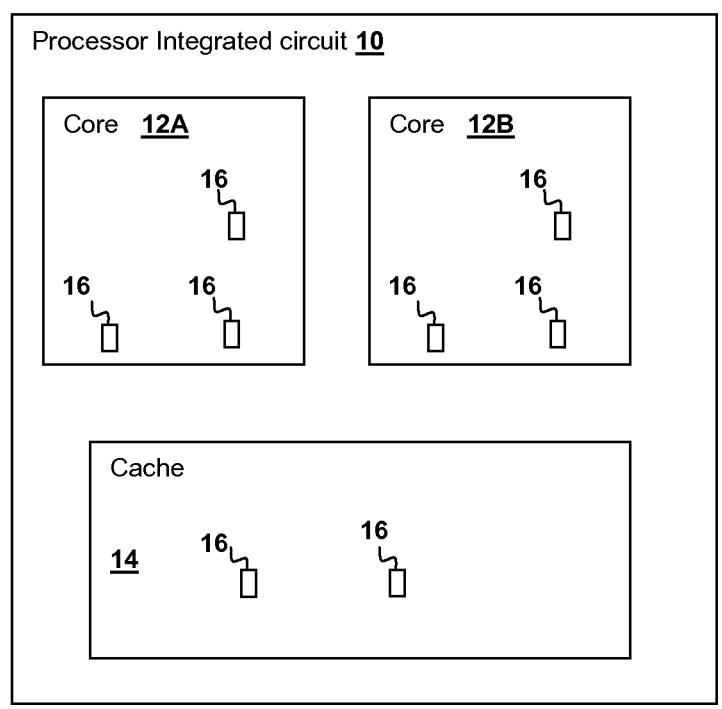
FIG. 1 is a block diagram illustrating an exemplary processor integrated circuit 10.

With reference now to the figures, and in particular with reference to FIG. 1, a processor integrated circuit 10 in which power consumption/dissipation reduction techniques as described herein are applied, is shown. Processor integrated circuit 10 includes a pair of cores 12A, 12B coupled to a cache 14. In each of cores 12A, 12B as well as in cache 14, a number of trace arrays 16 are embedded that capture state information of circuits within cores 12A, 12B and cache 14, as processor integrated circuit 10 executes program instructions. Processor integrated circuit 10 is only an example of a circuit in which trace arrays 16 as disclosed herein may be embedded, and the architecture shown in FIG. 1 is not limiting with respect to the techniques described below in further detail.

Figure 2:
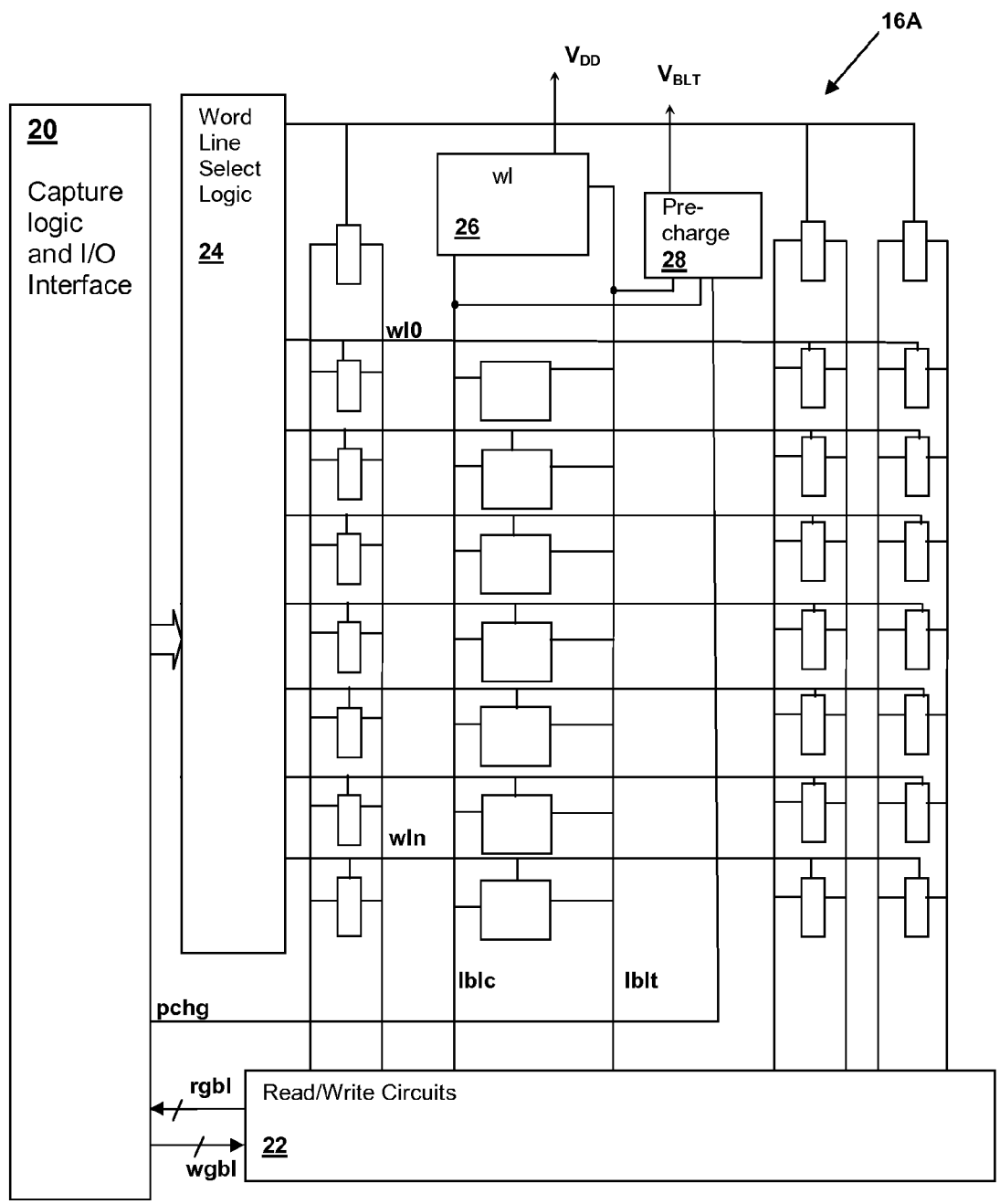
FIG. 2 is a block diagram illustrating details of an exemplary trace array circuit 16A that may be used to implement trace arrays 16 of processor integrated circuit 10 of FIG. 1.

Referring now to FIG. 2 a trace array circuit 16A that may be used to implement trace arrays 16 of FIG. 1 is shown. Trace array circuit 16A includes an I/O interface and capture logic 20 through which trace array circuit 16A receives state information during program execution (or other state-exercising sequence such as state machine operation of a logic circuit) and through which trace array circuit 16A returns the state information as a captured trace when polled by an external processor. The external processor may be one of cores 12A, 12B in FIG. 1, or an external processor, for example a processor coupled to a test interface of processor integrated circuit 10 that reads information stored in trace arrays 16 of FIG. 1 either via a special-purpose serial or parallel interface, or via a serial standard test interface such as a Joint Test Action Group (JTAG) interface. I/O interface and capture logic 20 is coupled to a word line select logic 24 that selectively enables one row of storage cells 26 when reading or writing values to the array, by asserting a corresponding one of word-lines wl0-wln. When a selected one of word-lines wl0-wln is active during a write operation, the value on each complementary local bit-line pair lblc, lblt is written to the corresponding storage cell 26 in the active row. Similarly, when a selected one of word-lines wl0-wln is active during a read operation, the value on each complementary local bit-line pair lblc, lblt is set by the corresponding storage cell 26 in the active row after the local bit-lines lblc, lblt are pre-charged by a pre-charge circuit 28 according to a pre-charge control signal pchg.

The values written to storage cells 26 are determined by global write bit-lines wgbl provided from the capture logic portion of I/O interface and capture logic 20 according to the state information collected during program execution. The values read from storage cells 26 are returned to the I/O interface portion of I/O interface and capture logic 20 when the trace information is read from trace array circuit 16A are provided via global read bit-lines rgbl. The example array of storage cells 26 is only one sub-array shown for example, and in an actual trace array 16 there will be a number of global read and write bit-lines that are multiplexed to provide the final connections between the sub-arrays and I/O interface and capture logic 20. Read/write circuits 22 provide the data interface to and from local bit-line pairs lblc, lblt and also provide the power consumption/power dissipation reducing features as described herein. Since there are distinct operating differences between trace arrays and ordinary random-access memories (RAM), the trace array circuits 16A described herein tailor hardware features to provide the most appropriate operating conditions for trace array circuit 16A. Trace array operation during program trace is generally characterized by long high-rate sequences of identical write operations with no intervening read operations. The data values change only when the input state information changes. Conversely, trace array operations during read-back of trace information is not necessarily continuous or high-rate. Therefore, the trace array circuits 16A disclosed herein use global write bit-lines wgblt, wgblc that are static, since continuously pre-charging and discharging of global write bit-lines wgblt, wgblc consumes significantly more power than maintaining static states of global write bit-lines wgblt, wgblc, which only change when the captured state information changes. The state of global write bit-lines wgblt, wgblc are only presented to the local bit-lines when the local write enable signal is active, so that global write bit-lines wgblt, wgblc can be maintained in a static state.

Figure 3A:
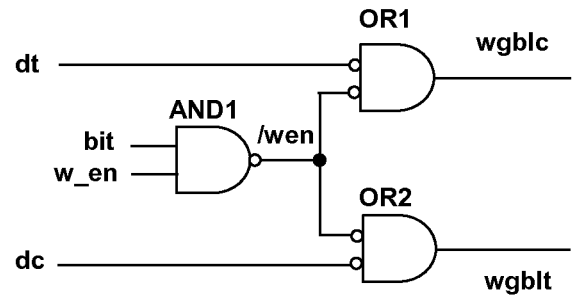
FIGS. 3A-3B and FIGS. 4A-4B are schematic diagrams of portions of read/write circuits 22 that may be implemented in trace array circuit 16A of FIG. 2.

Referring now to FIG. 3A, a static global write bit-line circuit is shown having operating characteristics as described above. A logical-AND gate AND1 gates the sub-array selection value bit according to a write enable signal w_en to produce a control signal /wen. A pair of logical-OR gates OR1, OR2 gate complementary write data signals dt and dc onto corresponding global write bit-lines wgblc and wgblt, respectively, in response to control signal /wen. (True and complement signals are crossed due to the net inversion through the global write bit-line circuit.)

Figure 3B:
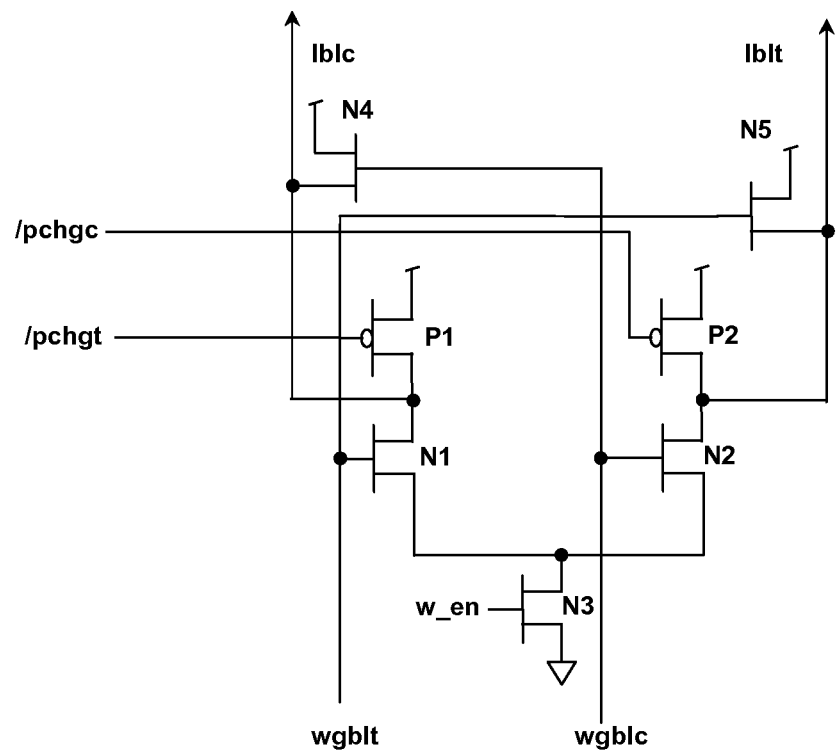

Referring now to FIG. 3B, the dynamic local bit-line driver circuit that receives the output of the static global write bit-line circuit of FIG. 3A is shown. A transistor N3 is a foot device that prevents discharge (evaluation) of either of local bit-lines lblt, lblc except when write enable signal w_en is active. When write enable signal w_en is active, transistors N1 and N2, responsive to the values of corresponding global write bit-lines wgblt, wgblc, conduct to discharge one of local bit-lines lblt, lblc depending on the values of global write bit-lines wgblt, wgblc. One of transistors N4, N5 will be activated to charge the other one of local bit-lines lblt, lblc, according to the values of global write bit-lines wgblt, wgblc. Transistors P1 and P2 are activated prior to the write cycle by activating precharge control signals /pchgc, /pchgt, providing the functionality of pre-charge circuit 28 in FIG. 2 for write operations. Pre-charge circuit 28 is enabled for read operations only when I/O interface and capture logic 20 asserts pre-charge enable signals, which are prevented during a first mode of operation while trace array 16 is capturing data, but enabled when data is being read from storage cells 26 of the particular sub-array, generally after trace capture is complete.

Figure 4A:
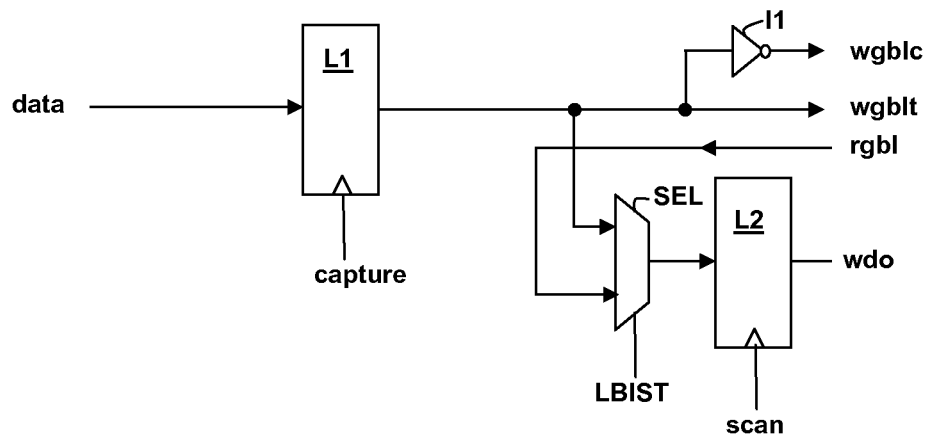

Referring now to FIG. 4A, another circuit is shown that provides another advantage over traditional RAM arrays for use in trace array implementations. The depicted circuit provides selective write-through operation that conserves power when trace values are being captured by trace array 16. Since the global read lines have high capacitance, providing actual write-through operation wastes energy. The depicted circuit receives the write data values, which are captured by a latch L1 in response to a clock signal capture, to generate write global bit-line wgblt, and write global bit-line wgblc via an inverter I1. While a first operating mode is selected during trace capture, e.g., during program execution, a selector SEL delivers the write global bit-line wgblt value to another latch L2 that provides a write-through output wdo in response to a first selection state of selector SEL. When actual write-through operation is required, such as during BIST, the LBIST control signal causes selector SEL, in response to a second selection state, to select the read global bit-line rgbl as input to latch L2 providing accurate write-through timing and testability of the write-through path.

Figure 4B:
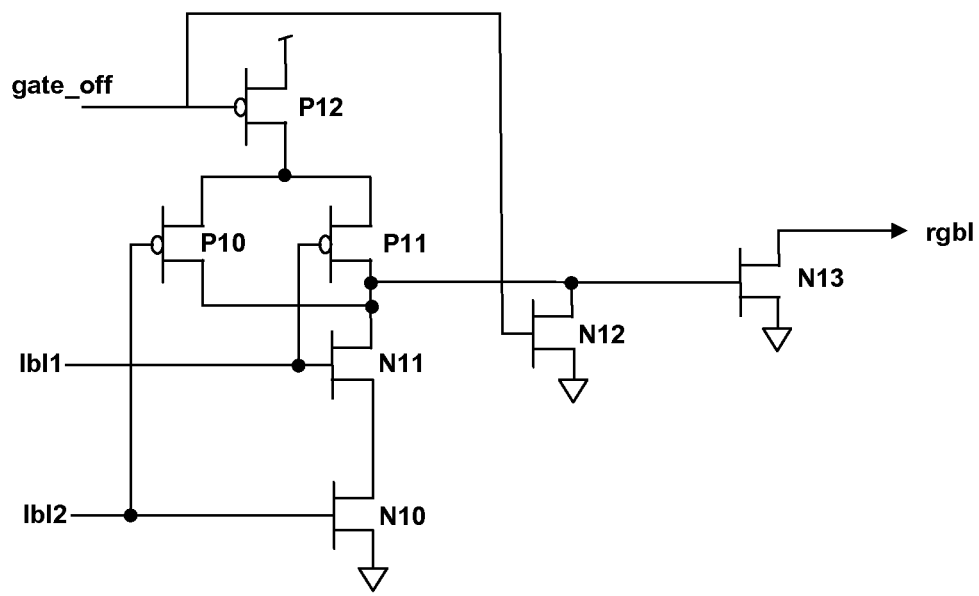

Referring to FIG. 4B, an exemplary read circuit of trace array 16 is shown. Local bit-line signals lbl1, lbl2 are examples of local bit-line signals provided from a sub-array for a given bit, one of which has write-through data imposed on the local bit-line lbl1 or lbl2 when a write operation is performed by the circuit of FIG. 3B. When a control signal gate_off is asserted, a transistor P12 is turned off, preventing conduction of current through the static logical-NAND gate formed by transistors P10-P11 and transistors N10-N11. Also when control signal gate_off is asserted, a transistor N12 is turned on, preventing a transistor N13 from being activated and isolating read global bit-line rgbl from the read circuit, and preventing toggling of the high-capacitance global read bit-line rgbl.

Figure 5:
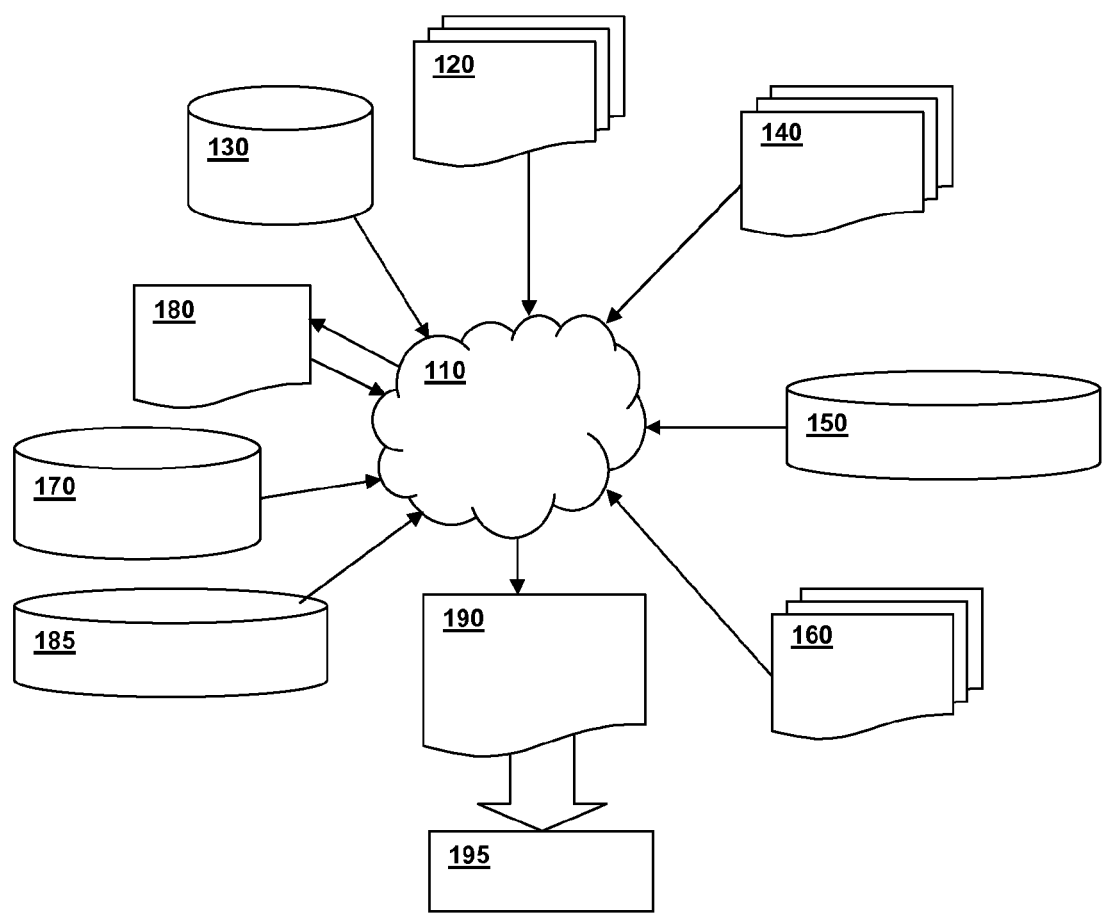
FIG. 5 is a flow diagram of a design process that can be used to fabricate, manufacture and test the processor of FIG. 1.

FIG. 5 shows a block diagram of an exemplary design flow 100 used for example, in semiconductor IC logic design, simulation, test, layout, and manufacture. Design flow 100 includes processes, machines and/or mechanisms for processing design structures or devices to generate logically or otherwise functionally equivalent representations of the design structures and/or devices described above and shown in FIGS. 1-2 and 4-5. The design structures processed and/or generated by design flow 100 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 100 may vary depending on the type of representation being designed. For example, a design flow 100 for building an application specific IC (ASIC) may differ from a design flow 100 for designing a standard component or from a design flow 100 for instantiating the design into a programmable array, for example a programmable gate array (PGA) or a field programmable gate array (FPGA). FIG. 5 illustrates multiple such design structures including an input design structure 120 that is preferably processed by a design process 110. Input design structure 120 may be a logical simulation design structure generated and processed by design process 110 to produce a logically equivalent functional representation of a hardware device. Input design structure 120 may also or alternatively comprise data and/or program instructions that when processed by design process 110, generate a functional representation of the physical structure of a hardware device. Whether representing functional and/or structural design features, input design structure 120 may be generated using electronic computer-aided design (ECAD) such as implemented by a core developer/designer. When encoded on a machine-readable data transmission, gate array, or storage medium, input design structure 120 may be accessed and processed by one or more hardware and/or software modules within design process 110 to simulate or otherwise functionally represent an electronic component, circuit, electronic or logic module, apparatus, device, or system such as those shown in FIGS. 1-2, 3A-3B and 4A-4B. As such, input design structure 120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 110 preferably employs and incorporates hardware and/or software modules for synthesizing, translating, or otherwise processing a design/simulation functional equivalent of the components, circuits, devices, or logic structures shown in FIGS. 1-2, 3A-3B and 4A-4B to generate a Netlist 180 which may contain design structures such as input design structure 120. Netlist 180 may comprise, for example, compiled or otherwise processed data structures representing a list of wires, discrete components, logic gates, control circuits, 110 devices, models, etc. that describes the connections to other elements and circuits in an integrated circuit design. Netlist 180 may be synthesized using an iterative process in which netlist 180 is resynthesized one or more times depending on design specifications and parameters for the device. As with other design structure types described herein, netlist 180 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 110 may include hardware and software modules for processing a variety of input data structure types including Netlist 180. Such data structure types may reside, for example, within library elements 130 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 140, characterization data 150, verification data 160, design rules 170, and test data files 185 which may include input test patterns, output test results, and other testing information. Design process 110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 110 without deviating from the scope and spirit of the invention. Design process 110 may also include modules for performing standard circuit design processes such as timing analysis, verification, design rule checking, place and route operations, etc. Design process 110 employs and incorporates logic and physical design tools such as HDL compilers and simulation model build tools to process input design structure 120 together with some or all of the depicted supporting data structures along with any additional mechanical design or data (if applicable), to generate a second design structure 190. Design structure 190 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to input design structure 120, design structure 190 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-2, 3A-3B and 4A-4B. In one embodiment, design structure 190 may comprise a compiled, executable HDL simulation model that functionally simulates the devices shown in FIGS. 1-2, 3A-3B and 4A-4B.

Design structure 190 may also employ a data format used for the exchange of layout data of integrated circuits and/or symbolic data format (e.g. information stored in a GDSII (GDS2), GL1, OASIS, map files, or any other suitable format for storing such design data structures). Design structure 190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-2, 3A-3B and 4A-4B. Design structure 190 may then proceed to a stage 195 where, for example, design structure 190 proceeds to tape-out, is released to manufacturing, is released to a mask house, is sent to another design house, is sent back to the customer, etc.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A processor integrated circuit, comprising:
   a plurality of functional units for executing program instructions; and
   at least one trace array coupled to at least one of the functional units for storing states of the at least one functional unit during execution of the program instructions, and providing a resulting trace for subsequent analysis of operation of the processor subsequent to the storing of the states, wherein the at least one trace array includes power management features responsive to a control signal that has a first state asserted during the execution of the program instructions and a second state asserted during an interval in which the program instructions are not being executed, whereby power consumption of the at least one trace array is reduced by the power management features.

2. The processor integrated circuit of claim 1, wherein the at least one power management feature includes disabling write-through operations to the trace array responsive to the control signal being in the first state, and enabling write-through operations to the trace array responsive to the control signal being in the second state.

3. The processor integrated circuit of claim 2, further comprising disabling of pre-charge of dynamic read bit-lines of the trace array responsive to the control signal being in the first state, and enabling pre-charge of the dynamic read bit-lines responsive to the control signal being in the second state.

4. The processor integrated circuit of claim 2, further comprising providing a bypass pathway coupling write data inputs to read data outputs of the trace array to provide simulated write-through capability when the control signal is in the first state.

5. The processor integrated circuit of claim 1, wherein the at least one trace array has dynamic read bit-lines and static write bit-lines, whereby power consumption due to charging and discharging write bit-lines is limited to changes in logic state required to represent the corresponding data values written to the trace array.

6. The processor integrated circuit of claim 5, further comprising disabling of pre-charge of the dynamic read bit-lines responsive to the control signal being in the first state, and enabling pre-charge of the dynamic read bit-lines responsive to the control signal being in the second state.

7. The processor integrated circuit of claim 1, further comprising disabling of pre-charge of dynamic read bit-lines of the trace array responsive to the control signal being in the first state, and enabling pre-charge of the dynamic read bit-lines responsive to the control signal being in the second state.

8. A trace array circuit, comprising:
   an interface for providing access to the trace array circuit;
   at least one trace array coupled to the interface for storing sequences of states of a logical circuit, and providing a resulting trace for subsequent analysis of operation of the logical circuit subsequent to the storing of the states, wherein the at least one trace array includes at least one power management feature responsive to a control signal that has a first state asserted during the storing sequences of states and a second state asserted during an interval in which the stored states are accessed via the interface, whereby power consumption of the at least one trace array is reduced by the power management feature.

9. The trace array circuit of claim 8, wherein the at least one power management feature includes disabling write-through operations to the trace array responsive to the control signal being in the first state, and enabling write-through operations to the trace array responsive to the control signal being in the second state.

10. The trace array circuit of claim 9, further comprising disabling of pre-charge of dynamic read bit-lines of the trace array responsive to the control signal being in the first state, and enabling pre-charge of the dynamic read bit-lines responsive to the control signal being in the second state.

11. The trace array circuit of claim 9, further comprising providing a bypass pathway coupling write data inputs to read data outputs of the trace array to provide simulated write-through capability when the control signal is in the first state.

12. The trace array circuit of claim 8, wherein the at least one trace array has dynamic read bit-lines and static write bit-lines, whereby power consumption due to charging and discharging write bit-lines is limited to changes in logic state required to represent the corresponding data values written to the trace array.

13. The trace array circuit of claim 12, further comprising disabling of pre-charge of the dynamic read bit-lines responsive to the control signal being in the first state, and enabling pre-charge of the dynamic read bit-lines responsive to the control signal being in the second state.

14. The trace array circuit of claim 8, further comprising disabling of pre-charge of dynamic read bit-lines of the trace array responsive to the control signal being in the first state, and enabling pre-charge of the dynamic read bit-lines responsive to the control signal being in the second state.

15. A method of collecting traces of sequential states in a processor, the method comprising:
   executing program instructions using a plurality of functional units of the processor;
   storing states of the at least one functional unit during execution of the program instructions in at least one trace array;
   setting a state of a control signal to a first state during the storing;
   providing a resulting trace for subsequent analysis of operation of the processor subsequent to the storing of the states; and
   setting the state of the control signal to a second state during the providing, wherein the control signal selectively enables at least one power management feature of the at least one trace array, whereby power consumption of the at least one trace array is reduced by enabling of the at least one power management feature.

16. The method of claim 15, wherein the at least one power management feature includes disabling write-through operations to the trace array responsive to the control signal being in the first state, and enabling write-through operations to the trace array responsive to the control signal being in the second state.

17. The method of claim 16, further comprising disabling of pre-charge of dynamic read bit-lines of the trace array responsive to the control signal being in the first state, and enabling pre-charge of the dynamic read bit-lines responsive to the control signal being in the second state.

18. The method of claim 16, further comprising providing a bypass pathway coupling write data inputs to read data outputs of the trace array to provide simulated write-through capability when the control signal is in the first state.

19. The method of claim 15, wherein the at least one trace array has dynamic read bit-lines and static write bit-lines, and wherein the method further comprises disabling of pre-charge of the dynamic read bit-lines responsive to the control signal being in the first state, and enabling pre-charge of the dynamic read bit-lines responsive to the control signal being in the second state.

20. The method of claim 15, further comprising disabling of pre-charge of dynamic read bit-lines of the trace array responsive to the control signal being in the first state, and enabling pre-charge of the dynamic read bit-lines responsive to the control signal being in the second state.

* * * * *